United States Patent
Tung

(10) Patent No.: US 10,462,093 B2
(45) Date of Patent: Oct. 29, 2019

(54) MESSAGE DATA TRANSFER

(71) Applicant: Facebook, Inc., Menlo Park, CA (US)

(72) Inventor: Yen-Ting Tony Tung, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 379 days.

(21) Appl. No.: 14/958,631

(22) Filed: Dec. 3, 2015

(65) Prior Publication Data

US 2017/0163590 A1 Jun. 8, 2017

(51) Int. Cl.
*G06F 15/16* (2006.01)
*H04L 12/58* (2006.01)
*G06F 11/10* (2006.01)
*H04W 4/18* (2009.01)
*H04W 4/21* (2018.01)

(52) U.S. Cl.
CPC .......... *H04L 51/32* (2013.01); *G06F 11/1004* (2013.01); *H04L 51/10* (2013.01); *H04L 51/24* (2013.01); *H04W 4/18* (2013.01); *H04W 4/21* (2018.02)

(58) Field of Classification Search
CPC ......... H04L 51/32; H04L 51/10; H04L 51/24; H04L 67/10; H04L 67/12; H04L 67/06; H04L 67/02; H04L 67/26; H04L 67/04; H04L 51/00; H04L 4167/06; G06F 11/10; G06F 17/30781; G06F 17/30147; H04W 4/18; H40L 67/06; G06Q 10/10
USPC ........................................................ 709/206
See application file for complete search history.

(56) References Cited

U.S. PATENT DOCUMENTS

| | | | |
|---|---|---|---|
| 7,020,685 B1* | 3/2006 | Chen | H04W 88/02 455/403 |
| 8,930,944 B2* | 1/2015 | Goodwin | G06F 8/20 717/178 |
| 2003/0126303 A1* | 7/2003 | Kadakia | H04L 63/0442 719/313 |
| 2005/0220064 A1* | 10/2005 | Hundscheidt | H04L 12/18 370/342 |
| 2006/0005135 A1* | 1/2006 | Vetelainen | G11B 27/034 715/723 |
| 2006/0133307 A1* | 6/2006 | Fukasawa | H04L 41/0816 370/328 |
| 2007/0208824 A1* | 9/2007 | Ullman | G06F 17/30899 709/217 |
| 2008/0098212 A1* | 4/2008 | Helms | H04L 63/0428 713/155 |
| 2009/0221307 A1* | 9/2009 | Wolak | G06Q 10/10 455/466 |
| 2011/0276657 A1* | 11/2011 | LeBlanc | H04W 4/18 709/219 |
| 2012/0124146 A1* | 5/2012 | Hsiao | H04L 51/36 709/206 |
| 2012/0202533 A1* | 8/2012 | Abhari | H04L 51/063 455/466 |

(Continued)

*Primary Examiner* — William G Trost, IV
*Assistant Examiner* — Tan Doan
(74) *Attorney, Agent, or Firm* — Baker Botts L.L.P.

(57) ABSTRACT

In one embodiment, a method includes receiving a request to send data to a user. The data exceeds a message size limit of a delivery channel associated with the user. The method also includes converting the data into a number of messages that each conform to the message size limit; and sending the number of messages through the delivery channel.

20 Claims, 5 Drawing Sheets

(56) References Cited

U.S. PATENT DOCUMENTS

2015/0249627 A1* 9/2015 Jimenez ............... H04L 51/066
                                                        709/206
2015/0293817 A1* 10/2015 Subramanian .... G06F 17/30212
                                                        707/645

* cited by examiner

MESSAGE DATA TRANSFER

TECHNICAL FIELD

This disclosure generally relates to delivering messages to a user.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a message-providing system may deliver data to a client device using a data-bandwidth-limited or long-polling interface (e.g., notifications). Messages may be used to trigger an application to display some data to users. Messages may also trigger a network fetch to update the mailbox of a messaging service. In particular embodiments, data may be sent to a client device by breaking up a message into multiple push messages, if size of the data exceeds the size or payload limit of the messaging protocol. The messages may include sequence data to determine the relationship between the multiple push messages, so that the content of the push messages may be used to reconstruct the data sent to the user. The messages may include a check-sum or other error detection data to determine the received messages contain all the information needed to reconstruct the data. Embedded images or attachments may be separately fetched after the content is displayed to the user.

In particular embodiments, a server may determine there is data to be sent to the user. The server may analyze the data to determine which components should be sent to a client device and which components may be stored for subsequent fetching (e.g., large attachments) by the client device. The server may parse the content into portions that are compatible with the payload limit of a delivery channel and create a checksum to ensure message integrity. The messages may also be encrypted for security or privacy. In particular embodiments, the messages may be multicast using multiple network protocols (e.g., cellular and WI-FI networks). The client device may receive the multiple messages and infer if any of the messages were not received or were corrupted. The inference may be performed using a Reed-Solomon or other suitable error correction algorithm. In particular embodiments, the client device may display a partial preview of message after a pre-determined period of time.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
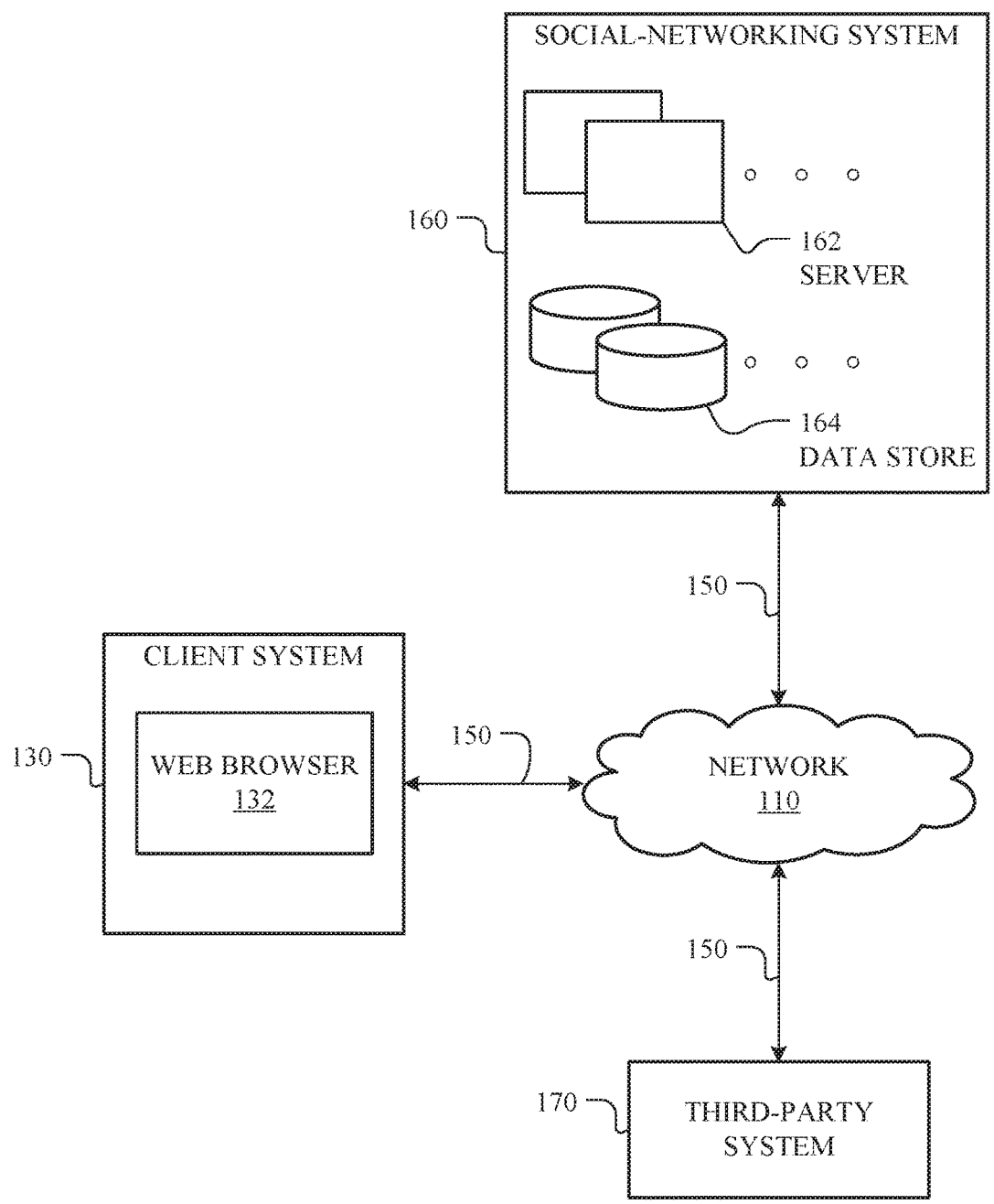
FIG. 1A illustrates an example network environment associated with a social-networking system.

In particular embodiments, data may be delivered to a client device using a data-bandwidth-limited or long-polling interface (e.g., messages or notifications). As described below, notifications may be used to signal a native application of the client device to display data to user. Notifications that are pushed to a client device may trigger the client device to retrieve data and update a mailbox of a messaging service. In particular embodiments, content may be sent to a user and once fully sent to the client device, a message or notification associated with the content may be sent to the client device.

In particular embodiments, a message-providing system may deliver messages or notifications to a user in a user-aware manner. Such messages or notifications may be sent through one or more delivery channels, e.g., sent by one or more communication media (e.g., short messaging service (SMS) messages, multimedia messaging service (MMS) messages, electronic mail (e-mail), particular application, or voice) to one or more unique endpoints (e.g., a telephone number, an e-mail address, a particular client device as specified by a unique device identifier, a particular user account for the particular application or client device). In particular embodiments, the message-providing system may be implemented as part of a social-networking system that may handle requests from third-party systems to deliver notifications to a user of the social-networking system in a user-aware manner. The social-networking system may register one or more delivery channels for delivery of messages to the user. Upon receiving one or more requests to send content to the user, the social-networking system may assess the user's current delivery context with respect to the registered delivery channels and determine a delivery policy to be applied to the request(s). The social-networking system may then handle the requests in accordance with the delivery policy, which may include sending at least one message to the user in fulfillment of the requests.

In particular embodiments, a policy engine of the message-providing system may assess different factors in order to determine the delivery policy (e.g., the delivery instructions) for a message. For any particular notification, the policy engine may assess not only (1) information associated with the message (e.g., the source, the content, or the format) and (2) information associated with a particular user (e.g., demographic information for the user, the user's location, the user's available delivery channels and the status thereof, the user's current delivery context, user profile information, or social-networking information for the user).

In particular embodiments, a registration service of the message-providing system may collect and store information sent by a device of the user upon enabling a new delivery channel (a communication medium-endpoint combination). For example, if the user installs a software application on their computing device through which messages may be delivered, the application may send registration information back to the registration service indicating that a new delivery channel is now available for this particular user—that a new communication medium (e.g., a particular application) is available for a particular endpoint (e.g., the computing device). The registration information may include, by way of example and not limitation: a unique identifier for the endpoint, features and capabilities of the endpoint (e.g., audio-visual specifications, battery capacity, or network connectivity specifications), a unique identifier for the communication medium, features and capabilities of the communication medium (e.g., maximum message size, data transfer allotment, or maximum bandwidth), or a unique identifier for the installed instance of the software application.

FIG. 1A illustrates an example network environment 100 associated with a social-networking system. Network environment 100 includes a client system 130, a social-networking system 160, and a third-party system 170 connected to each other by a network 110. Although FIG. 1A illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1A illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, global positioning system (GPS) device, digital camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT EDGE, MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other delivery channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "delivery channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof.

In particular embodiments, a server of social-networking system 160 may receive a request to send content to client system 130 of a user. Data may be sent to client system 130 by fracturing the data into multiple push notifications. As an example and not by way of limitation, if the size of the data exceeds the size or payload limit of notifications (e.g., between approximately 1 kB to approximately 4 kB), the data may be fractured into multiple push notifications that includes the content and some sequence data. The sequence data may be used to define the relationship between the notifications, so that the data of the notifications may be used by client system 130 to reconstruct the sent content. In particular embodiments, the notifications may include a checksum or other error detection data to determine the received notifications include all of the information required to reconstruct the data. Embedded images or attachments may be separately fetched after the data provided by the notifications is displayed to the user.

In particular embodiments, the server of social-networking system 160 may analyze the data to be sent to the user to determine which portion of the data should be sent to one or more endpoints of the user and which portions may be stored for subsequent fetching (e.g., large attachments) by the user. As described below, the server may parse the data into portions that are compatible with the payload limit of one or more delivery channels and include a checksum to ensure message integrity. As an example and not by way of limitation, the messages may be multicast using multiple network protocols (e.g., cellular and WI-FI networks). In particular embodiments, the messages may be encrypted by the server for security or privacy.

In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. In particular embodiments, the data sent to the user may correspond to gatekeeper or configuration updates, data triggering a forced logout from a particular system, data revoking a login on a particular system, revoking or edit messages. These actions may be performed based on opt-in settings of the user stored on the authorization servers. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 1B:
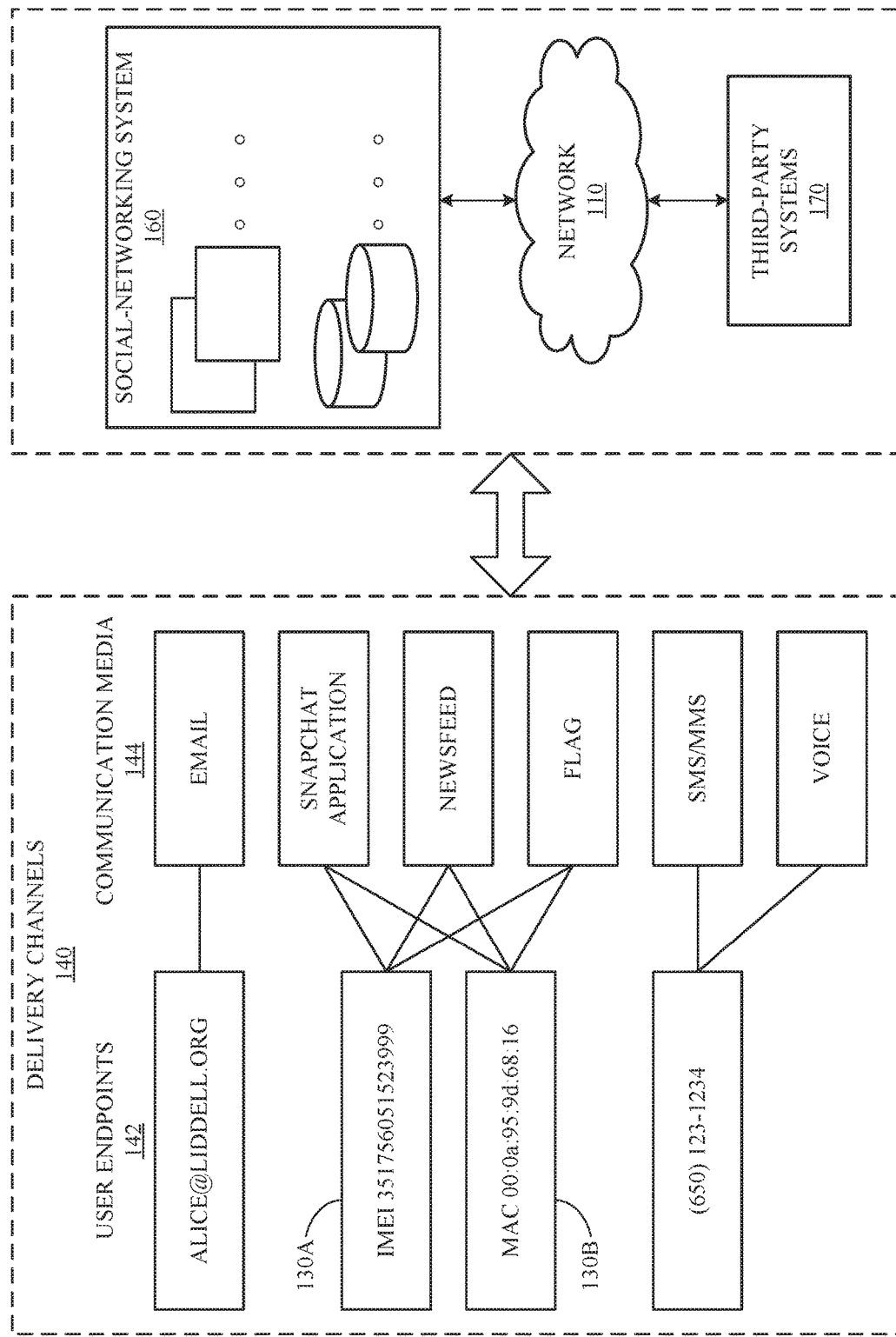
FIG. 1B illustrates an example architecture for delivering notifications to a user.

FIG. 1B illustrates an example architecture for delivering messages to a user. Messages may be used to signal an application of a client device to display some data to users. Messages may also be used to trigger a network fetch for updating a mailbox associated with a particular messaging service. In an example embodiment described herein, elements of the message-providing system may be implemented as part of a social-networking system, and the message-providing system may handle delivery of messages generated by third-party systems as well as by the social-networking system itself. In particular embodiments, elements of the message-providing system may be implemented as part of a third-party system.

In particular embodiments, data may be sent to a client system by reusing a persistently available data channel (e.g., a push notification interface). As an example and not by way of limitation, data may be sent to a client system through multiple messages on one or more delivery channels described below. Data that exceeds the payload limit of a particular delivery channel may be fractured into multiple messages that each conform to the payload limit of the particular delivery channel (e.g., approximately 20 MB for e-mail). As an example and not by way of limitation, data that exceeds the payload size of push notifications may be fractured into multiple push notifications, while the same data may be less than the payload size of an e-mail message and may be sent in one e-mail message. In particular embodiments, the sequence data may be used by the endpoint of user to determine the relationship between the multiple messages, so that the received data is reconstructed using the content of the messages. The messages may include a checksum or other error-detection data to determine the received messages contain all the information needed to reconstruct the sent data. In particular embodiments, embedded images or attachments included with the data may be separately fetched after the data is displayed on an endpoint of the user.

As shown in FIG. 1B, messages may be delivered by way of a number of different delivery channels 140. As discussed above, a delivery channel 140 may comprise one or more uniquely-identified endpoints 142 and one or more communication media 144. As shown in FIG. 1B, messages may be delivered by one or more communication media (e.g., SMS, MMS, e-mail, particular application (e.g., social-networking application), voice, newsfeed, or flag) to one or more unique endpoints (e.g., a telephone number, an e-mail address, a particular client device as specified by a unique device identifier, a particular user account for the particular application or for the client device). In some embodiments, a particular communication media may deliver a message to more than one endpoint—for example, a mobile social-networking application installed on the user's smartphone client device 130A (a first endpoint) and a corresponding desktop social-networking application on the user's desktop computer 130B (a second endpoint). As another example, a third-party application such as SNAPCHAT (communication media) may be installed on the user's smartphone client device 130A (a first endpoint) and a corresponding web-based version on the user's desktop 130B (a second endpoint). As described above, the messages may be multicast using multiple network protocols (e.g., cellular and WI-FI networks). The communication media may be a push-type medium, such as for example SMS or e-mail, or it may be a pull-type medium, such as newsfeed.

In particular embodiments, the message-providing system may select different delivery channels for sending messages based on the user's available delivery channels and the status thereof. As an example and not by way of limitation, high-bandwidth content (e.g., a high-definition (HD) video clip) may be sent to a particular endpoint 142 using multiple messages. As another example, an application or operating system (OS) update may be sent to an appropriate endpoint 142 using multiple messages. As discussed above, the information about the user's available delivery channels may be retrieved from the registration data store (e.g., information to enable the message-providing system to deliver the notification to a social-networking application). In particular embodiments, a server of social-networking system 160 may analyze the content to determine which components should be sent to the client device and which components may be stored for subsequent fetching (e.g., large attachments) by endpoint 142. In particular embodiments, one or more of the user's available delivery channels may be selected to send the content to the client device based on the analysis of the content, the delivery policy of the user (described below), or a combination thereof.

One or more of the user's endpoints 142 may receive the multiple messages corresponding to data sent to the user. Sequence data of the messages may be used to determine the relationship between the messages, so that the content of the messages may be used to reconstruct the sent data. As described above, the messages may include a check-sum or other error detection data to determine the received push messages contains all the information needed to re-assemble the data. In particular embodiments, endpoints 142 may infer if any of the messages sent by the message-providing system were not received or were corrupted by using any suitable error-detection or error-correction algorithm. In particular embodiments, the inference may be performed using the Reed-Solomon error-correction algorithm. In particular embodiments, a partial preview of the data may be displayed on endpoints 142 after a pre-determined period of time. Embedded images or attachments may be separately fetched after the data is displayed to the user.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., social-networking applications, third-party applications, messaging applications, or external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. As described above, data sent to the user may correspond to gatekeeper or configuration updates, data triggering a forced logout from a particular system, data revoking a login on a particular system, revoking or edit messages. These messages may be sent to client system 130 based on opt-in settings of the user stored on the authorization servers. As an example and not by way of limitation, if the user opt-ins to allow messages to be edited, a subsequent message sent to endpoint 142 of the user may replace one or more of the previously sent messages with revised content. In response to a request from a user (or other entity) for a particular object stored in a data store 164 that corresponds to an embedded object or a portion of one or more messages, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 2:
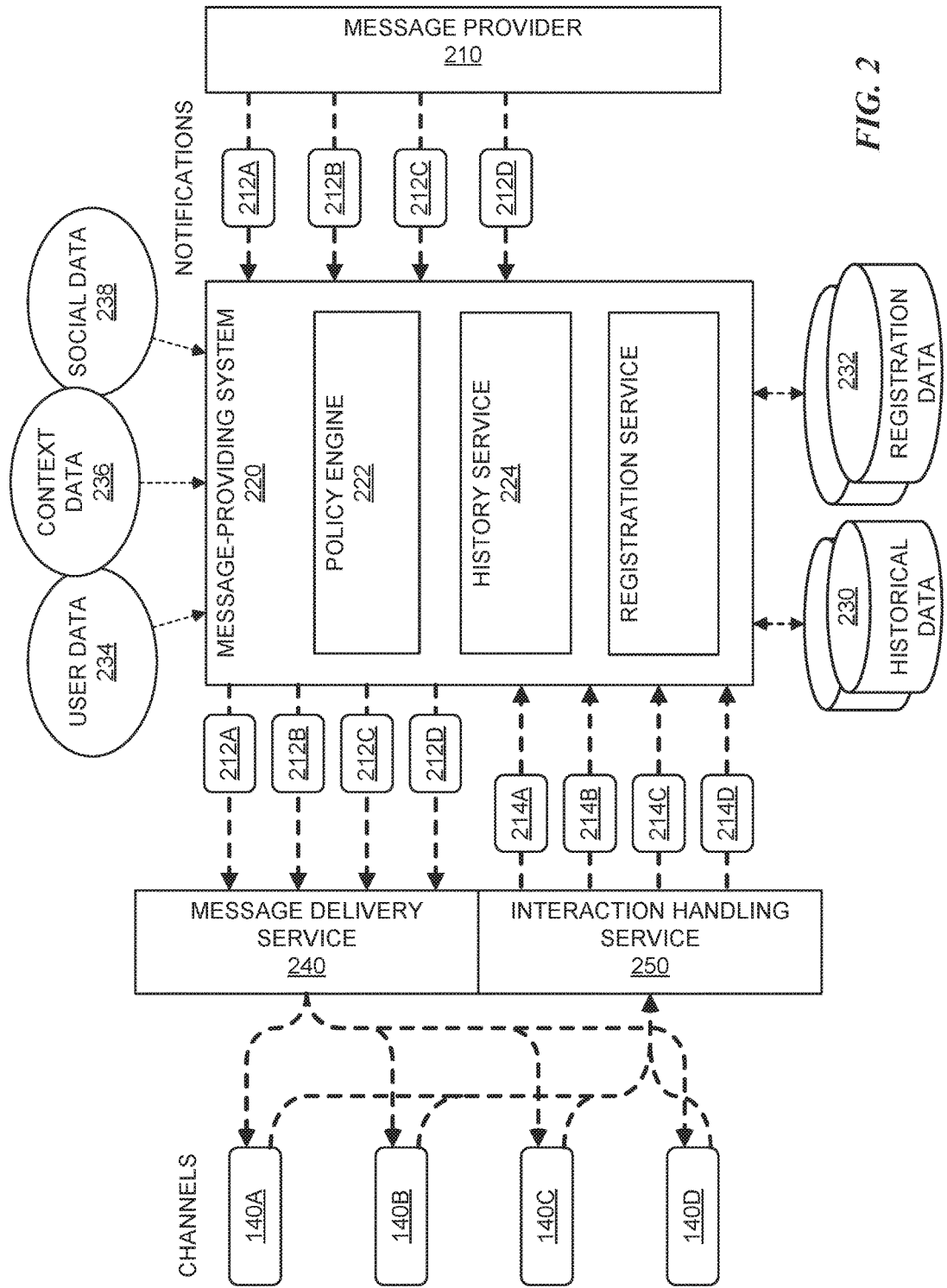
FIG. 2 illustrates an example embodiment of a message-providing system.

FIG. 2 illustrates an example embodiment of a message-providing system 220. A message provider 210 may provide messages 212A-D for delivery. Message provider 210 may include the social-networking system, a third-party system, or another system providing message content to be delivered by the message-providing system. In the example embodiment illustrated in FIG. 2, messages 212 may all be targeted to the same user, yet delivered differently, due to differences in the current context, the user's social-networking information relating to the content of the message, the user's past history of interacting with messages sent by a particular source, etc. In particular embodiments, policy engine 222 of message-providing system 220 may assess information associated with messages 212 (e.g., the source, the content, or the format). Such information may be provided within the content of messages 212 or as associated metadata.

In particular embodiments, the policy engine 222 may also assess information associated with a particular user (e.g., demographic information for the user, the user's location, the user's available delivery channels 140A-D and the status thereof, the user's current delivery context, user profile information, or social-networking information for the user). The policy engine 222 may retrieve information about the user's available delivery channels 140 from registration data store 232. Information such as the demographic information for the user, user profile information, or social-networking information for the user may be retrieved as user data 234 and social data 238. Information about the user's current delivery context may be retrieved as context data 236—this category of information may cover any aspect of the user's current delivery context, such as, by way of example and not limitation: information about: a location of the user, a calendar associated with the user, an indicated status of the user, a scheduled event associated with the location, a trajectory of the user, or a device status of one or more client devices associated with the user.

In particular embodiments, policy engine 222 may also retrieve historical notification information about this particular user's responses to past notifications (e.g., conversion rates for different notification/context/delivery patterns) and about prior context/delivery patterns (if any) for the current messages (and interaction levels, if any, for those prior context/delivery patterns) from history service 224. Once policy engine 222 has considered the relevant factors and produced a policy to be applied to messages 212, message delivery service 240 may handle formatting and delivering messages 212 in accordance with the context/delivery pattern specified in the delivery policy.

Message delivery service 240 may generate an appropriate form of messages 212 for delivery through a delivery channel 140, based on the features and capabilities of the underlying medium and endpoint. As an example and not by way of limitation, e-mail may have a size or payload limit of 20 MB, while notifications may have a size or payload limit of 1-4 kB. In particular embodiments, message delivery service 240 may fracture the data into multiple e-mail messages that are each 20 MB or less, while generating notifications of 4 kB or less for the same data. In particular embodiments, embedded images or attachments that are part of the data may be separately fetched from social-networking system 160 or third-party system 170.

Message delivery service 240 may schedule messages 212 for delivery upon detecting a particular user delivery context (e.g., upon detecting that the user has begun actively using a particular endpoint appropriate for the data being sent; size or bandwidth of the content being delivered; or upon determining that the user is using a particular application associated with messages 212). As an example and not by way of limitation, data corresponding to a update for an application of a mobile phone may be scheduled for delivery when message delivery service 240 detects a mobile phone of the user is powered on. As another example, data corresponding to high-bandwidth HD content may be scheduled for delivery when message delivery service 240 detects the user is using a high-performance computer. As another example, data corresponding an OS update may be scheduled for delivery when message delivery service 240 detects the appropriate client system is powered on.

After having delivered the messages to delivery channels 140, user interaction data 214A-D may be sent back to an interaction handling service 250, which sends the user interaction data 214A-D on to history service 224. History service 224 of the message-providing system may collect and analyze the user's responses to past notifications in order to determine the user's level of interaction (if any) with the past messages. Information about the user's responses to past messages may be stored in historical notification data store 230.

Figure 3:
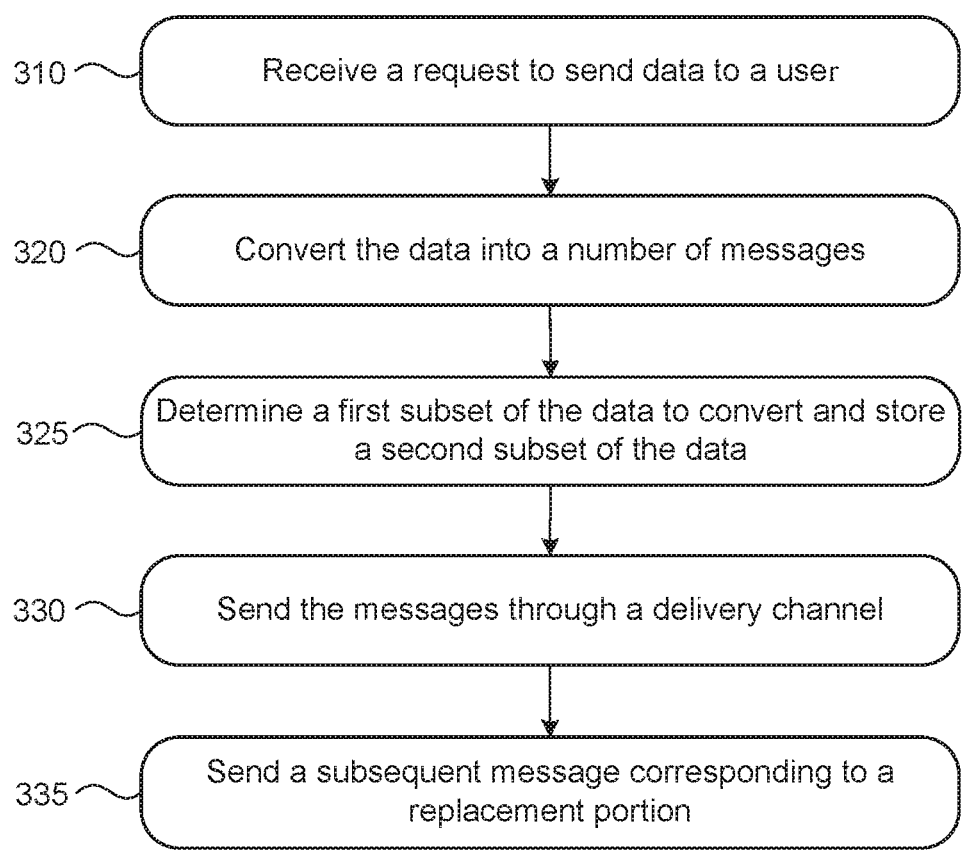
FIG. 3 illustrates an example method for transferring data through messages.

FIG. 3 illustrates an example method 300 for transferring data through notifications. In step 310, a computing system may receive a request to send data to a user. In particular embodiments, the computing system may be a social-networking system and the data to be sent may exceed a message size limit of a delivery channel. In particular embodiments, the delivery channel is determined based on a delivery policy.

In step 320, the computing system converts the data into a number of messages. In particular embodiments, each message conforms to the message size limit of the message-providing system. As an example and not by way of limitation, the message-size limit may correspond to a payload size of a notification, which may be approximately 4 kB. As another example, the message-size limit may correspond to a payload size of an e-mail message.

In step 325, the computing system may determine a first subset of the data to convert to the number of messages and stores a second subset of the data. In particular embodiments, the second subset of the data may correspond to a portion of the data for subsequent downloading by the user. As an example and not by way of limitation, the messages sent to the user may include a link to download the stored second subset of the data.

In step 330, the computing system sends the messages through the delivery channel. As an example and not by way of limitation, an application for installation on a client system may be sent as multiple push notifications to a particular endpoint of the user. In step 335, a subsequent message may be sent through the delivery channel. In particular embodiments, the subsequent message corresponds to a replacement portion to replace a portion of the data. As an example and not by way of limitation, the subsequent message may be a replacement to one or more of the messages sent in step 330 that corresponds to a revision of the data being sent to the user.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for method for transferring data through messages including the particular steps of the method of FIG. 3, this disclosure contemplates any suitable method for transferring data through messages including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
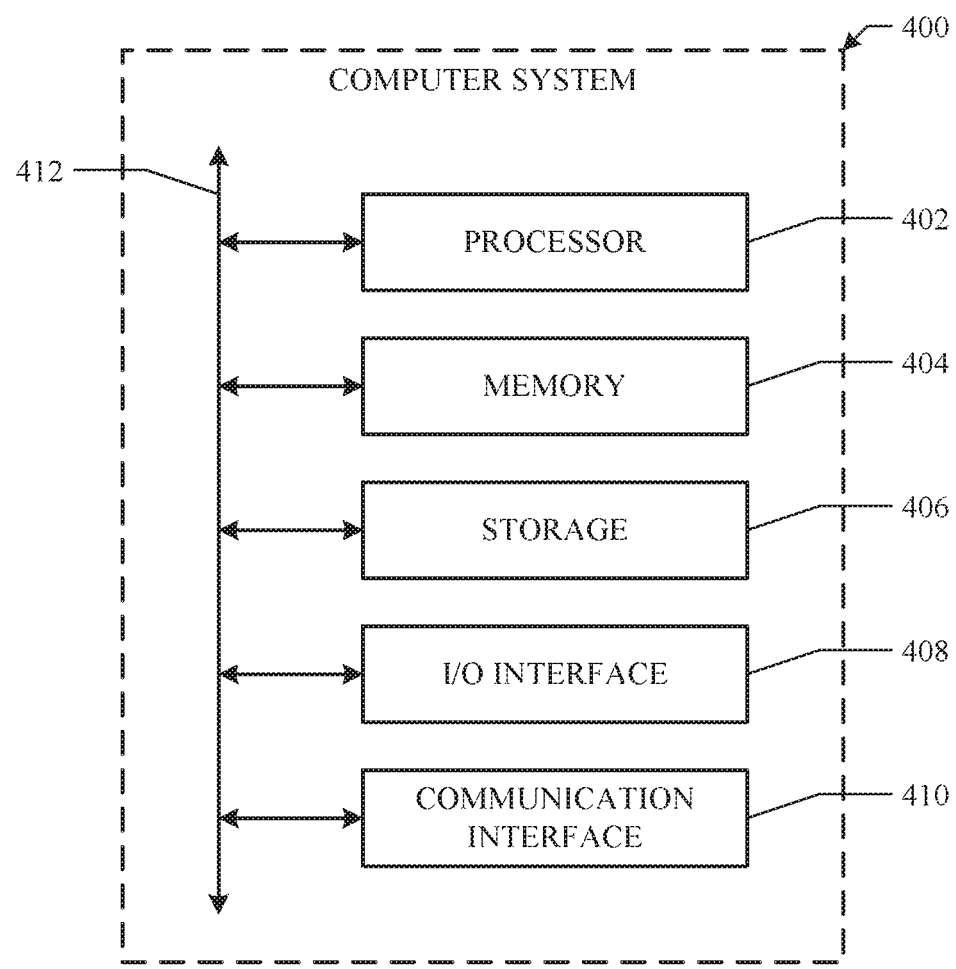
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, receiving a request to send data to a user;
   by the computing device, selecting a particular delivery channel from a plurality of delivery channels based at least in part on a status of a client device of the user;
   by the computing device, determining a first subset of the data for sending to the client device of the user and a second subset of the data for storing at the computing device, wherein the second subset of the data correspond to a portion of the data for subsequent downloading by the user;
   by the computing device, in response to the first subset of the data exceeding a message size limit of the particular delivery channel, converting the first subset of the data into a plurality of messages that are based at least in part on capabilities of the particular delivery channel, wherein:
   each of the messages conform to the message size limit of the particular delivery channel, and
   the messages comprise sequence data describing relationship between each of the messages; and
   by the computing device, automatically sending the plurality of messages through the particular delivery channel at a time that is based at least in part on the status of the client device, wherein the sequence data and content of the messages are used to reconstruct the first subset of the data from the plurality of messages at the client device of the user, and wherein the first subset of the data when reconstructed from the plurality of messages at the client device of the user comprises a link to download the second subset of the data from the computing device, and wherein the second subset of the data when downloaded replaces a portion of the first subset of the data.

2. The method of claim 1, wherein sequence data comprises information about an ordering sequence of the messages.

3. The method of claim 1, wherein at least one of the messages comprises error-detection information.

4. The method of claim 1, wherein at least one of the messages comprises information to detect one or more missing or corrupted messages.

5. The method of claim 4, wherein the information corresponds to information of a Reed-Solomon code.

6. The method of claim 1, wherein the second subset of the data comprises an embedded image or attachment.

7. The method of claim 1, wherein the second subset of the data exceeds the size limit of the delivery channel.

8. The method of claim 1, further comprising encrypting each of the messages prior to sending.

9. The method of claim 1, wherein requested data corresponds to a gatekeeper update, configuration update, forced logout of a particular system, or revoked login of a particular system.

10. The method of claim 1, wherein:
    the plurality of messages comprise a plurality of notifications sent in accordance to a delivery policy; and
    the delivery policy comprises:
    identification of a particular subset of a plurality of endpoints of the user to send the notifications to; or
    identification of the delivery channel to send the notifications to the user in.

11. The method of claim 10, wherein the delivery channel comprises a WI-FI and cellular network.

12. The method of claim 1, wherein the messages are sent in accordance with privacy settings of the user.

13. The method of claim 1, wherein:
the delivery channel comprises a communication media and an endpoint;
one or more of the delivery channels is associated with a mobile computing device; and
the first subset of the data is reconstructed from the messages by a software application installed on the mobile computing device.

14. The method of claim 13, wherein the software application is a social-networking application.

15. The method of claim 1, wherein the size limit corresponds to a payload size of a message.

16. The method of claim 15, wherein the payload size is 4 kilobytes.

17. The method of claim 1, wherein the computing device is a social-networking system.

18. The method of claim 1, wherein the second subset of the data is separately fetched after the first subset of the data is displayed on the client device of the user.

19. On or more computer-readable non-transitory storage media embodying software configured when executed to:
receive a request to send data to a user;
select a particular delivery channel from a plurality of delivery channels based at least in part on a status of a client device of the user;
determine a first subset of the data for sending to the client device of the user and a second subset of the data for storing at the computing device, wherein the second subset of the data correspond to a portion of the data for subsequent downloading by the user;
in response to the first subset of the data exceeding a message size limit of the particular delivery channel, convert the first subset of the data into a plurality of messages that are based at least in part on capabilities of the particular delivery channel, wherein:
each of the messages conform to the message size limit of the particular delivery channel, and
the messages comprise sequence data describing relationship between each of the messages; and
automatically send the plurality of messages through the particular delivery channel at a time that is based at least in part on the status of the client device, wherein the sequence data and content of the messages are used to reconstruct the first subset of the data at the client device of the user, and wherein the first subset of the data when reconstructed from the plurality of messages at the client device of the user comprises a link to download the second subset of the data from the computing device, and wherein the second subset of the data when downloaded replaces a portion of the first subset of the data.

20. A device comprising:
one or more processors; and
one or more computer-readable non-transitory storage media coupled to the processors and embodying software configured when executed to:
receive a request to send data to a user;
select a particular delivery channel from a plurality of delivery channels based at least in part on a status of a client device of the user;
determine a first subset of the data for sending to the client device of the user and a second subset of the data for storing at the computing device, wherein the second subset of the data correspond to a portion of the data for subsequent downloading by the user;
in response to the first subset of the data exceeding a message size limit of the particular delivery channel, convert the first subset of the data into a plurality of messages that are based at least in part on capabilities of the particular delivery channel, wherein:
each of the messages conform to the message size limit of the particular delivery channel, and
the messages comprise sequence data describing relationship between each of the messages; and
automatically send the plurality of messages through the particular delivery channel at a time that is based at least in part on the status of the client device, wherein the sequence data and content of the messages are used to reconstruct the first subset of the data at the client device of the user, and wherein the first subset of the data when reconstructed from the plurality of messages at the client device of the user comprises a link to download the second subset of the data from the computing device, and wherein the second subset of the data when downloaded replaces a portion of the first subset of the data.

* * * * *